United States Patent
Barthel et al.

(10) Patent No.: US 8,321,774 B2
(45) Date of Patent: Nov. 27, 2012

(54) METHOD FOR FAIL-SAFE TRANSMISSION, SAFETY SWITCHING DEVICE AND CONTROL UNIT

(75) Inventors: Herbert Barthel, Herzogenaurach (DE); Wolfgang Stripf, Karlsruhe (DE)

(73) Assignee: Siemens Aktiengesellschaft, München (DE)

( * ) Notice: Subject to any disclaimer, the term of this patent is extended or adjusted under 35 U.S.C. 154(b) by 880 days.

(21) Appl. No.: 12/384,651

(22) Filed: Apr. 7, 2009

(65) Prior Publication Data

US 2009/0259923 A1    Oct. 15, 2009

(30) Foreign Application Priority Data

Apr. 9, 2008    (EP) .................................... 08007059

(51) Int. Cl.
- *H03M 13/00* (2006.01)
- *H04L 1/00* (2006.01)
- *G08C 25/00* (2006.01)

(52) U.S. Cl. ........ 714/799; 714/758; 714/776; 370/389; 370/474

(58) Field of Classification Search .................. 714/799, 714/776, 758
See application file for complete search history.

(56) References Cited

U.S. PATENT DOCUMENTS

| 6,707,814 B1 * | 3/2004 | Ohgane ......................... 370/389 |
| 2003/0188252 A1 * | 10/2003 | Kim et al. ..................... 714/779 |
| 2006/0195752 A1 * | 8/2006 | Walker et al. ................. 714/748 |

FOREIGN PATENT DOCUMENTS

| DE | 101 08 800 A1 | 9/2002 |
| WO | WO 02/089389 A1 | 11/2002 |

* cited by examiner

*Primary Examiner* — Guy Lamarre

(57) ABSTRACT

A method for fail-safe transmission of information between a transmitter and a receiver is disclosed. At least two telegrams relating to the information are transmitted as a first telegram via a first channel and a second telegram via a second channel from the transmitter to the receiver. To identify an error affecting the information during transmission, a first identifier is generated from a first subset of the first telegram being used at the receiver to identify the information contained in the first telegram. This method is used for communication from a safety switching device to a control unit.

16 Claims, 3 Drawing Sheets

METHOD FOR FAIL-SAFE TRANSMISSION, SAFETY SWITCHING DEVICE AND CONTROL UNIT

CROSS REFERENCE TO RELATED APPLICATIONS

This application claims priority of European Patent Application No. 08007059.2 EP filed Apr. 9, 2009, which is incorporated by reference herein in its entirety.

FIELD OF INVENTION

The invention relates to a method for the fail-safe transmission of information between a transmitter and a receiver, with at least two telegrams relating to the information being transmitted as a first telegram by way of a first channel and a second telegram by way of a second channel from the transmitter to the receiver. The invention also relates to a method for operating a safety switching device at a control unit. The invention also relates to a safety switching device suitable for the fail-safe transmission of information to a control unit and vice versa, with a first data line for a first channel and a second data line for a second channel, with first means for transmitting/receiving a first telegram relating to the information on the first channel and a second telegram on the second channel. As a counterpart to the safety switching device the invention relates to a control unit suitable for the fail-safe transmission of information to a safety switching device and vice versa, with a first data line for a first channel and a second data line for a second channel, with third means for transmitting/receiving a first telegram relating to the information on the first channel and a second telegram on the second channel.

BACKGROUND OF INVENTION

Safety switching devices such as fail-safe sensors with the functions of a light curtain, a laser scanner, a two-hand pushbutton, a pressure mat, etc. are used for reliable field bus communication in process automation for example.

According to the prior art with fail-safe systems or during the fail-safe transmission of data from a safety switching device to a higher-order control unit telegrams with a backup appendix are sent in duplicate according to IEC 61 784-3 Annex A, Model B and C. Since here the information content is transmitted in a redundant manner in two telegrams on two different data channels or with a time offset one after the other on one data channel to the receiver or to the control unit, this transmission method has the disadvantage of a lower level of error detection in relation to data volume.

More extensive measures are therefore required to identify mutilated data. This could be done using a CRC checksum. The longer the checksum, the higher the level of error detection. However a long checksum lengthens the telegram, having an adverse effect on the response times of the control system.

Even with a CAN bus solution (CAN open safety) the fail-safe information is transmitted in duplicate (according to model C).

SUMMARY OF INVENTION

The information is thus sent to the receiver in a redundant manner on two data lines. An object of the invention is to provide a method with an increased level of data integrity for the fail-safe transmission of information between a transmitter and a receiver.

With the method mentioned in the introduction the object is achieved in that for the second telegram, to identify an error affecting the information during transmission, a first identifier is generated at least from a first subset of the first telegram, being used at the receiver to determine the integrity of the information contained in the first telegram.

The data to be safeguarded is not sent a further time on a separate data line as in the prior art but a first identifier is generated, a so-called hash value for the data to be safeguarded is transmitted by way of the second data line. This has the advantage that a sufficiently high level of data integrity is achieved without increasing the data volume per channel or per line. This method also advantageously allows the requirement of a short response time for a telegram reply from the transmitter to the receiver and vice versa to be met. These advantages are tangible in particular with small quantities of data, e.g. 16 bits of information, and at low baud rates (less than one MBaud).

In one advantageous embodiment a second identifier is generated for the second telegram from a second subset of the first telegram, which is different from the first subset. The identifiers are generally CRC values. CRC is an abbreviation for Cyclic Redundancy Check. The cyclic redundancy check is a method known from information technology for determining a check value for data in order to be able to identify errors during the transmission of data. By generating the second identifier, in other words a further CRC check value in the second data telegram, it is possible to increase data integrity still further. The CRC check value is thus lengthened to check for freedom from error.

For simplified and faster assignment of the telegrams at the receiver it is advantageous if a continuous number is generated for the second telegram. Assignment is further simplified if the continuous number is also generated for the first telegram for assignment of the telegrams at the receiver.

The above-mentioned method is preferably used to operate a safety switching device at a control unit, whereby for communication from the control unit to the safety switching device and vice versa a first data line is used for the first channel and a second data line for the second channel. With the safety switching devices according to the prior art these safety switching devices are connected by way of three lines, a data line C/Q, a first supply voltage line and a second supply voltage line. In order to deploy the method advantageously with the safety switching devices, a hitherto unused pin is deployed for the realization of the second data line.

The first and second data line can now preferably be used as unshielded data lines during operation of a safety switching device at a control unit. In the case of stochastic or random transmission errors, e.g. due to EMC influences on the data lines; these errors can be identified and managed by the method. The probability of an error due to EMC interference is very high with unshielded data lines in particular. The data transmission method however now allows unshielded cables to be used for laying in the process automation industry for example, despite possible EMC interference. This is particularly advantageous, as these unshielded data lines are considerably more economical than shielded data lines. A further advantage is the use of the existing installation, which is generally fitted with unshielded cables/data lines.

With the safety switching device mentioned in the introduction the object is achieved in that it has second means for generating a first identifier at least from a first subset of the first telegram for the second telegram to identify an error affecting the information during transmission. Such second means could be embodied by an application-specific coding module of a programmable ASIC, in addition to the first means, which are embodied by a communication module for example.

It is also advantageous if the second means are embodied to generate a second identifier for the second telegram from a second subset of the first telegram, which is different from the first subset.

With the control unit mentioned in the introduction, which generally forms the counterpart to the safety switching device, the object mentioned in the introduction is also achieved in that fourth means are present at the control unit for generating a first identifier at least from a first subset of the first telegram for the second telegram to identify an error affecting the information during transmission.

To increase data integrity the fourth means are also embodied at the control unit in such a manner that they allow the generation of a second identifier from a second subset of the first telegram, which is different from the first subset.

If the identifier of the information is longer than the information, it is advantageous to accommodate some of the identifier in the first telegram and the remainder of the identifier in the second telegram, so that both telegrams have the same length.

BRIEF DESCRIPTION OF THE DRAWINGS

The drawings show a number of exemplary embodiments of the method for the fail-safe transmission of information between a transmitter and a receiver, in which.

DETAILED DESCRIPTION OF INVENTION

Figure 1:
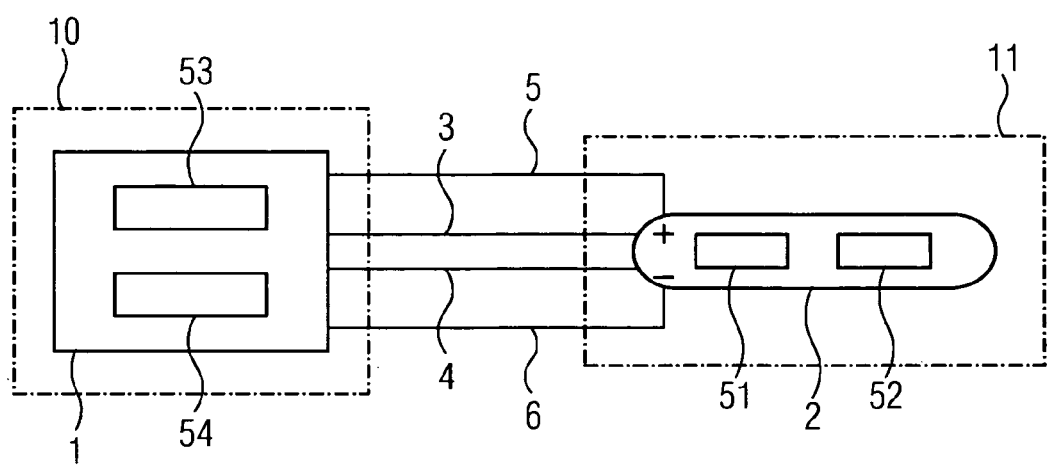
FIG. 1 shows a control unit with a safety switching device, FIGS. 2 to 5 respectively show a first and a second telegram with a different telegram structure

FIG. 1 shows a safety switching device 11 connected to a control unit 10. The control unit 10 essentially has a transmitter 1. It is not restricted here to this transmitter 1 only having the transmit function, it can likewise switch to the receive mode of operation. If the control unit 10 with its transmitter 1 operates in the transmit mode of operation, a receiver 2 is available in the safety switching device 11 to receive the sent information from the transmitter 2 in the control unit 10. The transmitter 1 is connected by way of four lines/wires to the receiver 2. A first line 3 (which together with the line 6 forms a data line) and a second line 4 (which together with line 6 forms a second data line) allow communication between the transmitter 1 and the receiver 2. The safety switching device 11 is supplied with an operating voltage by way of the supply voltage lines 5, 6. The control unit 10 is embodied with a third means 53 to transmit and receive information. This third means 53 allows it to transmit a first telegram 20 and a second telegram 21, see FIG. 1 to FIG. 5, to the safety switching device 11. In addition to the third means 53 the control unit 10 also has a fourth means 54 for generating a first identifier at least from a first subset of the first telegram 20. This first identifier is used to identify the information 22 contained in the first telegram 20 at the receiver 2 or in the safety switching device 11. During this co-called point to point transmission particularly adapted telegram frames and an adapted telegram structure are preferably used. Optimized distribution of CRC backup identifiers, preferably in the second telegram 21, allows a hamming distance to be increased to 10, in other words all conceivable possible 9 bit errors are discovered with this type of fail-safe transmission. It is also conceivable with digital sensors for example that are based on capacitive, magnetic, transformational, sonorous and other effects, not only to exchange for example digital switching signals or status signals between the control unit 10 and the safety switching device 11 but also any reliable parameter data that may be required for the safety switching device 11. It would also be possible to retrieve diagnostic data from the safety switching device 11 by way of the control unit 10. When the safety switching device 11 is first started up, parameterization telegrams could also be sent to the safety switching device 11 by way of the data lines 3 and 4. For further communication options an extension of a for example OSSD interface (OSSD=Output Signal Switching Device, here the safety switching output, i.e. the part of the contactless protection facility connected to the machine controller, which switches to the OFF state when the sensor part responds during appropriate operation) also offers the option of supplying multiple disconnect signals or measurement values from one safety switching device 11. It would therefore be possible to realize a combined sensor/actuator device with built-in integrity over the application range of the OSSD interface for safety switching devices.

This new technology has the following advantages over conventional interfaces for reliable field bus communication: simple and compatible interface extension according to IEC 61131/2,
linear extension of existing remote I/O modules,
point to point communication,
no field bus dependency,
separate power supply for reliable actuator technology,
use of standard microcontrollers and
no type spectrum extension.

The fail-safe data transmission method advantageously allows unshielded non-twisted cable connections to be used between the control unit 10 and the safety switching device 11. An extended embodiment (not shown) is a gate I/O link module connected by way of a field bus, which forms a master for a plurality of safety switching devices. The master then has an I/O link interface for example with 1-n connections. 1-n safety switching devices parameterized as slaves are then connected to these 1-n connections.

Figure 2:
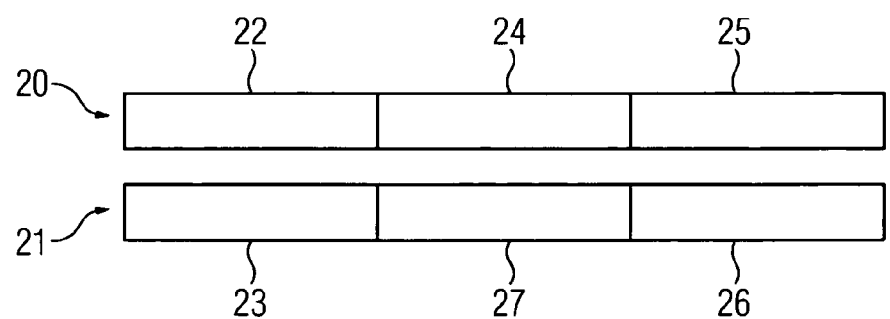

FIG. 2 shows a first telegram 20 and a second telegram 21. Compared with the prior art, in which the first telegram 20 and the second telegram 21 contain identical information only in redundant form, the second telegram 21 now has a different information content from the first telegram 20. Reading from left to right the first telegram 20 has information 22, a status field 24 and a checksum 25. The information 22 represents 16 bit data information, the status 24 is configured as 2 bit status and the checksum 25 is a 6 bit checksum. Also reading from left to right the second telegram 21 starts with a first identifier 23 followed by a 2 bit wide continuous number 27 followed by a checksum 26. Generating a first identifier 23, which in this instance is embodied as a CRC 16 value calculated by polynomial division of the information by the CRC 16 polynomial, e.g. the 139B7 polynomial, increases data integrity. This first identifier 23, which was generated as a hash value, ensures diversity between the first telegram 20 and the second telegram 21. Since these telegrams 20, 21 are transmitted on different channels, a system operated using these methods is a 2-channel diverse system. Diversity here refers to a strategy for managing errors with a common cause. In this process systems are configured with redundancy, but different implementations and no individual systems of identical structure are consciously used. This procedure is based on the idea that systems with the same output but different implementations are not susceptible to the same interference and therefore do not fail at the same time.

Figure 3:
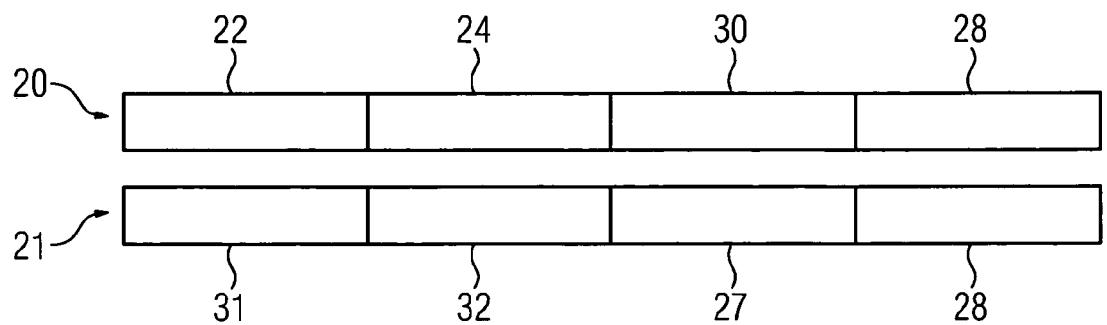

According to FIG. 3 the telegram structure of the first telegram 20 and the second telegram 21 includes a 24 bit long CRC check value distributed over the two telegrams 21, 22. The 24 bit long CRC24 check value is distributed as follows:

CRC24 (bits 21-24) with the reference character 30, CRC24 (bits 0-15) with the reference character 31. CRC24 (bits 16-20) with the reference character 32. The 24 bit long CRC24 check value is now divided between the first telegram 20 and the second telegram 21. Division between the two telegrams has the advantage that immunity to error is now increased but data volumes are not. Between the 16 bits of payload with the reference character 22 and the 4 bit component of the CRC24 check value with the reference character 30 are 2 bits of status information with the reference character 24. The first telegram 20 is completed with 2 bits of padding information 28. As well as the check values the second telegram 21 includes in its structure a continuous number 27 and two more padding bits 28.

Figure 4:
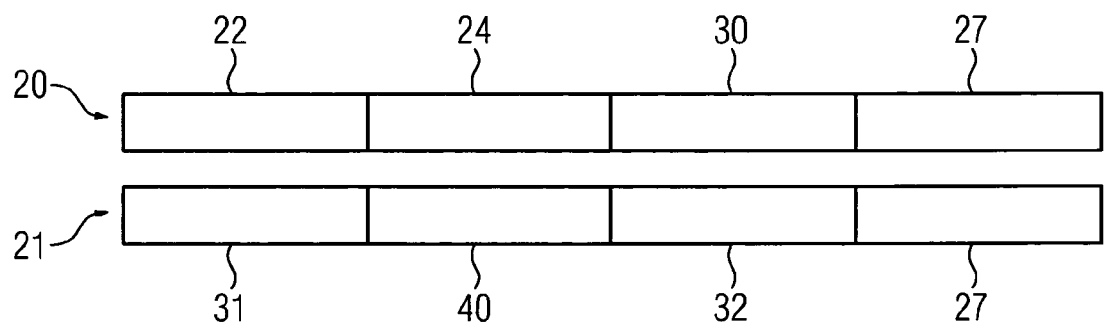

A further alternative for the telegram structure for the first telegram 20 and the second telegram 21 is shown in FIG. 4. In the first telegram 20, again reading from left to right, 16 bits of data are stored as information 22, two status bits 24 precede a component of a 24 bit long CRC24 check value. This component comprises the bits 21-24 of the 24 bit long CRC24 check value and is shown with the reference character 30. The first telegram 20 is completed with a 2 bit wide continuous number 27. The second telegram 21 has a further component of the 24 bit long CRC24 check value shown with the reference character 31. This component comprises the bits 0-15 of the CRC24 check value and is shown with the reference character 31. 2 bits of free information 40 follow. These free bits are followed by a further component of the CRC24 check value, namely the bits 16-20, CRC24 (bits 16-20) with the reference character 32. The second telegram 21 is again completed by a 2 bit wide continuous number 27.

Figure 5:
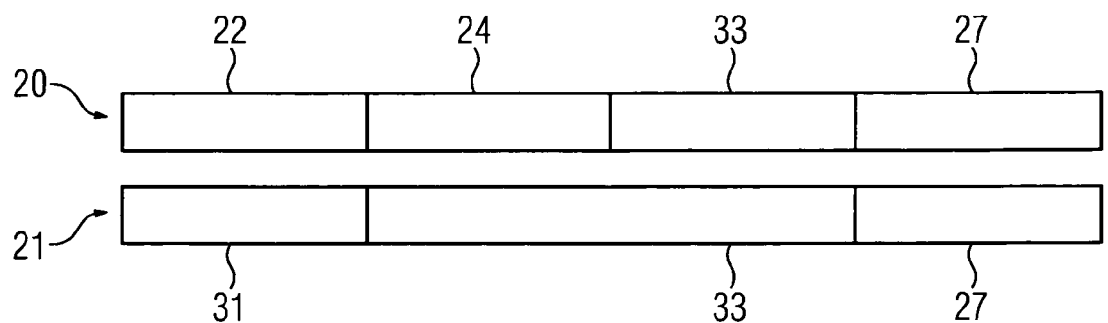

A further alternative for the telegram structure, with the available bits being used in an optimum manner, is shown in FIG. 5. In the first telegram 20 the 16 bit wide information 22 is followed by two status bits 24. As a particular feature these are now followed by a component of a 26 bit long CRC24 check value. This component CRC24 (bits 23-26) is identified with the reference character 33. This component CRC24 (bits 23-26) 33 is followed by a continuous number 27. The further components of the 26 bit wide CRC24 check value are in the second telegram 21. The second telegram 21 starts with a further component of the 26 bit long CRC24 check value with the bits 0-15 CRC24 (bits 0-15) with the reference character 31. This is followed by the last component of the 26 bit long CRC24 check value CRC24 (bits 16-22) with the reference character 33. The second telegram 21 is completed with a 2 bit wide continuous number 27.

Figure 6:
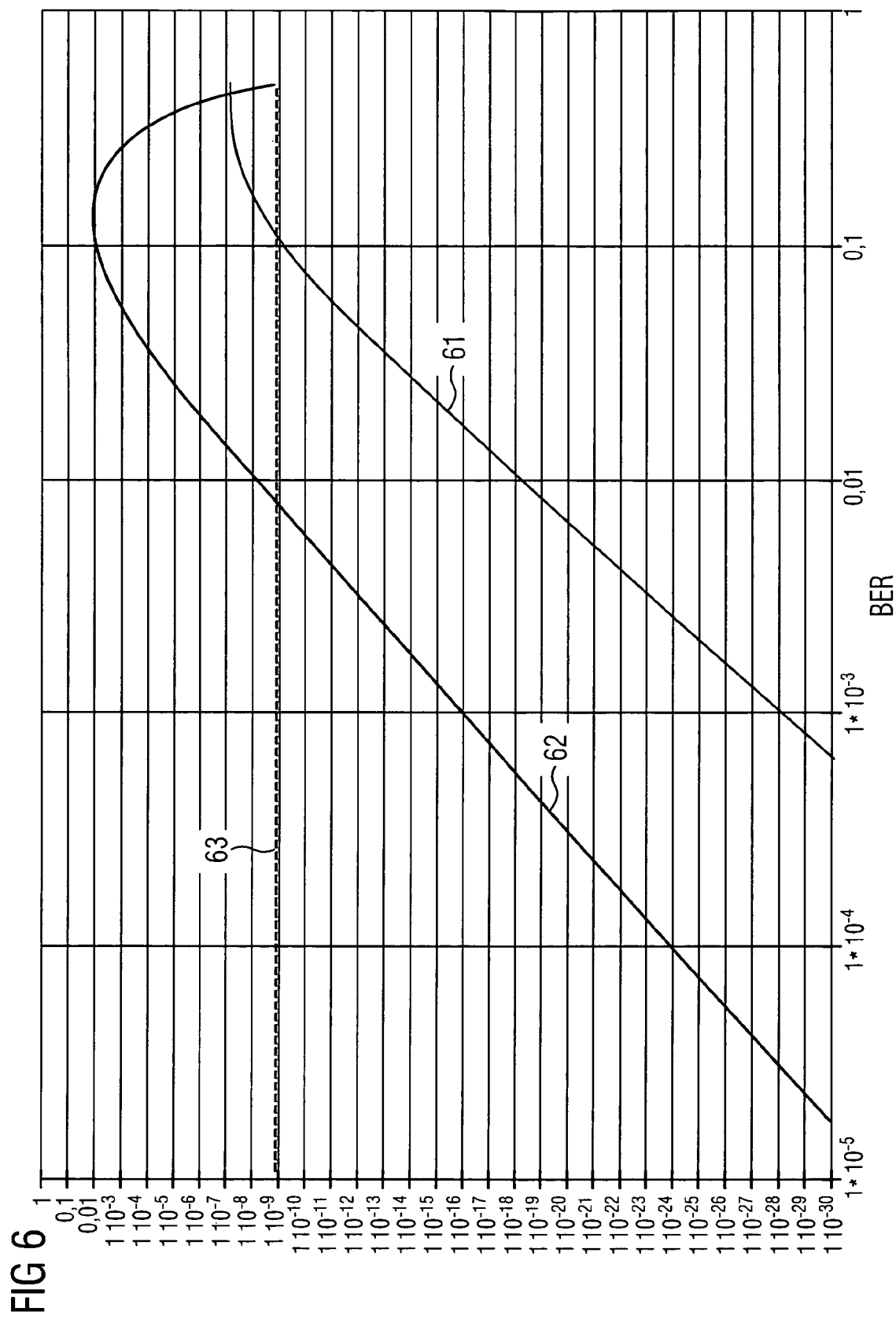
FIG. 6 shows a comparison of the probability of residual error with two different transmission methods.

FIG. 6 shows the profile of the probability of residual error with the method compared with the probability of residual error with the data transmission method according to the prior art, with the same information being transmitted on both channels. The diagram 60 shows a first graph 61 of the profile of the probability of residual error with a data transmission according to the conventional method subject to identical performance of the two methods. A second graph 62 shows the improved probability of residual error with the fail-safe data transmission method. A boundary line 63, representing a residual error rate of $10^{-9}$ per hour, cannot be exceeded for safety requirements according to SIL2 and SIL3. In the region of a bit error rate BER of 0.01 the method shows an improvement of more than the factor $10^7$ compared with the conventional solution, as shown in the first graph 61.

To summarize, it can be stated that payload and some of the CRC are transmitted by way of the first channel. The remaining components of the CRC are transmitted on the second channel as the same time as the first channel. This means that the backup value is increased from 12 bits to 24 bits for the same telegram duration. Advantage: compliance with error detection as required for safety applications without having an adverse effect on the response time of the system and meeting the transmission speed specified by the standard. Two at least functionally independent transmission paths also result→diversity. (24 bit CRCs achieve a significantly higher level of error detection than would be possible for example by means of other measures for redundant telegram transmission.

The invention claimed is:

1. A method for fail-safe transmission of information between a transmitter and a receiver, comprising:
   transmitting a first telegram relating to the information via a first channel from the transmitter to the receiver;
   transmitting a second telegram relating to the information via a second channel from the transmitter to the receiver;
   generating a first identifier for the second telegram from a first subset of the first telegram, the first identifier being configured to identify an error affecting the information during transmission; and
   determining an integrity of the information contained in the first telegram by the receiver using the first identifier, wherein the second telegram includes one or more hash values derived from a subset of the information within the first telegram.

2. The method as claimed in claim 1, further comprising:
   generating a second identifier for the second telegram from a second subset of the first telegram, the second subset being different from the first subset.

3. The method as claimed in claim 2, wherein a continuous number is generated for the second telegram.

4. The method as claimed in claim 3, wherein the continuous number is also generated for the first telegram for assignment of the telegrams at the receiver.

5. The method as claimed in claim 2, wherein the method is used for operating a safety switching device at a control unit, in which for communication from the control unit to the safety switching device and vice versa a first data line is used for the first channel and a second data line for the second channel.

6. The method as claimed in claim 5, wherein unshielded data lines are used for the first and second data lines.

7. The method as claimed in claim 1, wherein a continuous number is generated for the second telegram.

8. The method as claimed in claim 7, wherein the continuous number is also generated for the first telegram for assignment of the telegrams at the receiver.

9. The method as claimed in claim 1, wherein the method is used for operating a safety switching device at a control unit, in which for communication from the control unit to the safety switching device and vice versa a first data line is used for the first channel and a second data line for the second channel.

10. The method as claimed in claim 9, wherein unshielded data lines are used for the first and second data lines.

11. A safety switching device for fail-safe transmission of information to a control unit and vice versa, comprising:
    a first data line being used as a first channel;
    a second data line being used as a second channel;
    a first telegram relating to the information;

a second telegram relating to the information;
a first transmitting/receiving unit configured to transmit and receive the first telegram via the first channel and the second telegram via the second channel; and
a first generating unit configured to generate a first identifier for the second telegram from a first subset of the first telegram to identify an error affecting the information during transmission wherein the second telegram includes one or more hash values derived from a subset of the information within the first telegram.

12. The safety switching device as claimed in claim 11, wherein the first generating unit is configured to generate a second identifier for the second telegram from a second subset of the first telegram, the second subset being different from the first subset.

13. The safety switching device as claimed in claim 11, wherein unshielded data lines are used for the first and second data lines.

14. A control unit for fail-safe transmission of information to a safety switching device and vice versa, comprising:
a first data line being used as a first channel;
a second data line being used as a second channel;
a first telegram relating to the information;
a second telegram relating to the information;
a second transmitting/receiving unit configured to transmit and receive the first telegram via the first channel and the second telegram via the second channel;
a second generating unit configured to generate a first identifier for the second telegram from a first subset of the first telegram to identify an error affecting the information during transmission wherein the second telegram includes one or more hash values derived from a subset of the information within the first telegram.

15. The control unit as claimed in claim 14, wherein the second generating unit is configured to generate a second identifier for the second telegram from a second subset of the first telegram, the second subset being different from the first subset.

16. The control unit as claimed in claim 14, wherein unshielded data lines are used for the first and second data lines.

* * * * *